US011453837B2

(12) United States Patent
Pletsch et al.

(10) Patent No.: US 11,453,837 B2
(45) Date of Patent: Sep. 27, 2022

(54) RANDOM COPOLYMERS FOR USE AS BASE OILS OR LUBRICANT ADDITIVES

(71) Applicant: EVONIK OPERATIONS GMBH, Essen (DE)

(72) Inventors: Holger Pletsch, Frankfurt (DE); Emily Clare Schweissinger, Dortmund (DE); Hanna Spohr, Duisburg (DE); Sebastian Reimann, Wesseling (DE); Lars Pera, Hammerstein (DE); Marius Weiland, Heiden (DE); Boris Eisenberg, Heppenheim (DE); Dmitriy Shakhvorostov, Darmstadt (DE)

(73) Assignee: Evonik Operations GmbH, Essen (DE)

(*) Notice: Subject to any disclaimer, the term of this patent is extended or adjusted under 35 U.S.C. 154(b) by 0 days.

(21) Appl. No.: 17/292,451

(22) PCT Filed: Oct. 23, 2019

(86) PCT No.: PCT/EP2019/078857
§ 371 (c)(1),
(2) Date: May 10, 2021

(87) PCT Pub. No.: WO2020/099078
PCT Pub. Date: May 22, 2020

(65) Prior Publication Data
US 2022/0017835 A1 Jan. 20, 2022

(30) Foreign Application Priority Data
Nov. 13, 2018 (EP) .................................. 18205895

(51) Int. Cl.
*C10M 145/14* (2006.01)
*C08F 220/18* (2006.01)
*C08F 236/06* (2006.01)
*C10M 107/02* (2006.01)
*C10M 169/04* (2006.01)

(52) U.S. Cl.
CPC ..... *C10M 145/14* (2013.01); *C08F 220/1812* (2020.02); *C08F 236/06* (2013.01); *C10M 107/02* (2013.01); *C10M 169/041* (2013.01); *C08F 2800/10* (2013.01); *C10M 2205/0206* (2013.01); *C10M 2209/084* (2013.01)

(58) Field of Classification Search
CPC ............. C10M 145/14; C10M 107/02; C10M 169/041; C10M 2205/0206; C10M 2209/084; C08F 220/1812; C08F 236/06; C08F 2800/10
See application file for complete search history.

(56) References Cited

U.S. PATENT DOCUMENTS

| | | | |
|---|---|---|---|
| 3,541,064 A | 11/1970 | Yoshimoto et al. | |
| 3,795,615 A | 3/1974 | Pappas et al. | |
| 4,316,973 A | 2/1982 | Kennedy | |
| 4,533,482 A * | 8/1985 | Bollinger | C08F 279/02 508/472 |
| 4,656,219 A * | 4/1987 | Oyama | C08C 19/02 524/481 |
| 4,859,210 A | 8/1989 | Franz et al. | |
| 5,312,884 A * | 5/1994 | Gore | C08F 220/1804 526/328 |
| 6,008,164 A | 12/1999 | Aldrich et al. | |
| 6,059,955 A | 5/2000 | Cody et al. | |
| 6,071,980 A | 6/2000 | Guan et al. | |
| 6,090,989 A | 7/2000 | Trewella et al. | |
| 6,103,099 A | 8/2000 | Wittenbrink et al. | |
| 6,184,307 B1 | 2/2001 | Schisla | |
| 6,310,149 B1 | 10/2001 | Haddleton | |
| 6,332,974 B1 | 12/2001 | Wittenbrink et al. | |
| 6,350,723 B1 | 2/2002 | Mishra et al. | |
| 6,420,618 B1 | 7/2002 | Berlowitz et al. | |
| 6,475,960 B1 | 11/2002 | Berlowitz et al. | |
| 6,506,297 B1 | 1/2003 | Wittenbrink et al. | |
| 6,599,864 B1 | 7/2003 | Bertomeu | |
| 6,610,636 B2 | 8/2003 | Berlowitz et al. | |
| 6,624,263 B2 | 9/2003 | Matyjaszewski et al. | |

(Continued)

FOREIGN PATENT DOCUMENTS

| | | |
|---|---|---|
| EP | 0 471 266 | 2/1992 |
| EP | 0 566 048 | 10/1993 |

(Continued)

OTHER PUBLICATIONS

Anonymous: "Lösungspolymerisation— Römpp, Thieme," Aug. 31, 2008, XP055650313, retrieved from the internet: URL;https://roempp.thieme.de/roempp4.0/do/data/RD-12-01491; (retrieved on Dec. 12, 2019); submitted with English language machine translation.
International Search Report for corresponding PCT/EP2019/078857 filed Oct. 23, 2019.
Written Opinion of the International Searching Authority for corresponding PCT/EP2019/078857 filed Oct. 23, 2019.
International Preliminary Report on Patentability for corresponding PCT/EP2019/078857 filed Oct. 23, 2019.
European Search Report and Search Opinion for application EP 20 17 2862, filed May 5, 2020; corresponding to copending U.S. Appl. No. 17/307,006.

(Continued)

*Primary Examiner* — Ellen M McAvoy
(74) *Attorney, Agent, or Firm* — Law Office of: Michael A. Sanzo, LLC

(57) ABSTRACT

The invention relates to random copolymers comprising monomers derived from conjugated dienes and alkyl (meth) acrylates, a method for manufacturing the copolymers, lubricant compositions comprising the copolymers, and the use of the copolymers as additives for lubricant compositions or as a base oil for lubricant compositions. The copolymers are favorably used for driving system lubricating oils, hydraulic oils, engine oils and industrial oil formulations.

20 Claims, No Drawings

(56) References Cited

U.S. PATENT DOCUMENTS

| | | | |
|---|---|---|---|
| 6,841,695 | B2 | 1/2005 | Bollinger et al. |
| 7,067,049 | B1 | 6/2006 | Baillargeon et al. |
| 7,163,913 | B2 | 1/2007 | Briggs et al. |
| 7,572,874 | B2 | 8/2009 | Matyjaszewski et al. |
| 7,714,075 | B1 | 5/2010 | Le et al. |
| 2001/0025078 | A1 | 9/2001 | Mayer et al. |
| 2012/0053100 | A1* | 3/2012 | Radano .............. C10M 169/041 508/474 |
| 2013/0229016 | A1 | 9/2013 | Ghahary et al. |
| 2014/0011724 | A1 | 1/2014 | Onumata et al. |
| 2015/0275130 | A1 | 10/2015 | Willars et al. |
| 2017/0306259 | A1* | 10/2017 | Ding ..................... C08F 220/68 |
| 2018/0327687 | A1* | 11/2018 | Kwak .................. C10M 145/20 |
| 2019/0169521 | A1* | 6/2019 | Zhang .............. C08F 220/1811 |
| 2020/0347316 | A1* | 11/2020 | Yamamoto ........... C10M 145/14 |
| 2021/0347927 | A1 | 11/2021 | Schweissinger et al. |
| 2022/0017654 | A1 | 1/2022 | Pietsch et al. |

FOREIGN PATENT DOCUMENTS

| | | |
|---|---|---|
| EP | 0 668 342 | 8/1995 |
| EP | 0 776 959 | 6/1997 |
| EP | 3 378 877 | 9/2018 |
| FR | 2 289 597 | 5/1976 |
| GB | 1 030 306 | 5/1966 |
| GB | 1 112 749 | 5/1968 |
| GB | 1 165 286 | 9/1969 |
| GB | 2 270 317 | 3/1994 |
| JP | 2015/143346 | 8/2015 |
| WO | WO 98/40415 | 9/1998 |

OTHER PUBLICATIONS

International Search Report for PCT/EP2019/078865 filed Oct. 23, 2019; corresponding to copending U.S. Appl. No. 17/292,452.

Written Opinion of the International Searching Authority for PCT/EP2019/078865 filed Oct. 23, 2019; corresponding to copending U.S. Appl. No. 17/292,452.

International Preliminary Report on Patentability for PCT/EP2019/078865 filed Oct. 23, 2019; corresponding to U.S. Appl. No. 17/292,452.

Appendix E-API Oil Interchangeability Guidelines for Passenger Car Motor Oils and Diesel Engine Oils, section 1.3 "Base Stock Categories" (Apr. 2008).

Wang, et al., "Controlled/'Living' Radical Polymerization. Atom Transfer Radical Polymerization in the Presence of Transition-Metal Complexes," *J. Am. Chem. Soc. 117*:5614-5615 (1995).

Wang, et al., "Controlled/'Living' Radical Polymerization. Halogen Atom Transfer Radical Polymerization Promoted by a Cu(I)Cu(II) Redox Process," *Macromolecules 28*:7901-7910 (1995).

U.S. Appl. No. 17/307,006, filed May 4, 2021, Schweissinger.

U.S. Appl. No. 17/292,452, filed May 10, 2021, Pletsch.

European Search Report and Search Opinion for corresponding application EP 18 20 5895, filed Oct. 23, 2019.

European Search Report and Search Opinion for application EP 18 20 5924, filed Oct. 23, 2019; corresponding to copending U.S. Appl. No. 17/292,452.

* cited by examiner

RANDOM COPOLYMERS FOR USE AS BASE OILS OR LUBRICANT ADDITIVES

CROSS REFERENCE TO RELATED APPLICATIONS

The present application is US national stage of international application PCT/EP2019/078857, which had an international filing date of Oct. 23, 2019 and which claims priority to EP 18205895.8, filed on Nov. 13, 2018. These prior applications are hereby incorporated by reference herein in their entirety.

FIELD OF THE INVENTION

The invention relates to random copolymers comprising monomers derived from conjugated dienes and alkyl (meth) acrylates, a method for manufacturing the copolymers, lubricant compositions comprising the copolymers, and the use of the copolymers as additives for lubricant compositions or as a base oil for lubricant compositions. The copolymers are favorably used for driving system lubricating oils, hydraulic oils, engine oils and industrial oil formulations.

DESCRIPTION OF THE PRIOR ART

The present invention relates to the field of lubrication. Lubricants are compositions that reduce friction between surfaces. In addition to allowing freedom of motion between two surfaces and reducing mechanical wear of the surfaces, a lubricant may also inhibit corrosion of the surfaces and/or may inhibit damage to the surfaces due to heat or oxidation. Examples of lubricant compositions include, but are not limited to, engine oils, transmission fluids, gear oils, industrial lubricating oils, greases and metalworking oils.

A typical lubricant composition includes a base fluid (also referred to as base oils) and optionally one or more additives. Conventional base fluids are naturally occurring hydrocarbons, such as mineral oils, or synthetic compositions, such as poly-alpha-olefins, polyalkyl methacrylates, and ethylene-propylene copolymers.

A wide variety of additives may be combined with the base fluid, depending on the intended use of the lubricant. Examples of lubricant additives include, but are not limited to, oxidation inhibitors, corrosion inhibitors, dispersing agents, high pressure additives, anti-foaming agents and metal deactivators. For improvement of viscometric properties, viscosity index improvers (VII) and thickeners may be used. These viscosity modifiers are usually of polymeric type.

The drawback of adding polymeric additives to a fabricant formulation is that they will undergo shear stress and will mechanically degrade over time. Higher molecular weight polymers are better thickeners but will be more prone to shear stress leading to polymer degradation. The molecular weight of a polymer can be decreased, thereby obtaining a more shear stable polymer. These shear stable low molecular weight polymers are no longer very effective thickeners and must be used in larger concentrations in the lubricant in order to reach a desired viscosity.

Typical polymeric additives are based on polymers of alkyl (meth)acrylates. For example, patent applications EP 0 566 048 A1 and EP 0 471 266 A1 disclose random copolymers of alkyl (meth)acrylates and 1-alkenes having a weight-average molecular weight $M_w$ of 1,000 up to 100,000 g/mol and their use as components of lubricant oil compositions.

U.S. Pat. No. 6,350,723 discloses block copolymers comprising at least one block of alkyl methacrylates including $C_{12-30}$ alkyl methacrylates and a block of a polymerized conjugated diene having a number-average molecular weight $M_n$ of 15,000 up to 5,000,000 g/mol. The monomers derived from the dienes are selectively hydrogenated. The block copolymers are used as viscosity index improvers.

U.S. Pat. No. 4,533,482 discloses random copolymers including hydrogenated diolefins and lower alkyl (meth) acrylates and optionally higher alkyl (meth)acrylates having a weight-average molecular weight of 100,000 to 10,000,000 g/mol and their use as pour point depressants and viscosity index improvers. Because of their high weight-average molecular weights and broad PDI, these random copolymers do not show good shear stability which is a drawback when used as lubricant additives. Further, the copolymers require extensive work up after hydrogenation, which is not viable on industrial scale.

GB 1,112,749 discloses polymers described as suitable for use as viscosity index improvers, which are synthesized by emulsion polymerization of one or more di-olefins with one or more alkyl (meth)acrylates, followed by a hydrogenation in the presence of a nickel catalyst. Examples available in GB1,112,749 show copolymers of butadiene and lauryl methacrylate with a number-average molecular weight of 33,000 g/mol or 35,000 g/mol.

EP 0471266A1 discloses copolymers of 1-alkene and $C_4$ to $C_{32}$ alkyl(meth)acrylates for use as synthetic base oil or an additive thereof (see claim 1). Preferred alkyl(meth)acrylates are the $C_8$ to $C_{20}$ alkyl(meth)acrylates (page 5, line 32), more preferably alkyl(meth)acrylates with more than 10 carbon atoms and a high iso content (page 5, line 40). No shear stability tests are mentioned. Only thermal oxidative stability of the polymer/PAO formulations is discussed.

U.S. Pat. No. 6,350,723 discloses high molecular weight block copolymers of hydrogenated conjugated alkadienes and $C_{12}$-$C_{30}$ alkyl (meth)acrylates (claim 1) prepared by anionic polymerization followed by a hydrogenation step with supported palladium catalyst (claim 14, table 3).

PURPOSE OF THE INVENTION

Existing additives, such as those described in the above-mentioned prior art, do not have the necessary performance level for some applications and lack the required shear stability due to their high molecular weight or lack the required solubility in different types of base oil. Further, conventional polyalkyl methacrylate (PAMA) additives usually need to be added to a lubricant composition in a large amount to achieve the desired viscosimetric properties.

Therefore, the present invention aims at providing additives that are able to provide improved viscosimetric properties at a lower amount of additive. In addition, these additives should provide a high viscosity index, filterability and foam reduction in lubricant oil compositions. Moreover, the additives should be soluble in typical base fluids and have high shear stability. Furthermore, the additives should be producible in a simple and inexpensive manner, and especially commercially available components should be used. In this context, they should be producible on the industrial scale without new plants or plants of complicated construction being required for this purpose.

DETAILED DESCRIPTION OF THE INVENTION

Copolymers According to the Invention

In a first aspect, the invention relates to a random copolymer, obtainable by polymerizing a monomer composition comprising:
- (a) 5 to 55 mol-% of one or more conjugated dienes having 6 carbon atoms or less per molecule;
- (b) 10 to 45 mol-% of one or more $C_1$-$C_6$ alkyl(meth)acrylates;
- (c) 10 to 70 mol-% of one or more $C_7$-$C_{24}$ alkyl(meth)acrylates;
- (d) 0 to 10 mol-% of one or more esters of (meth)acrylic acid and a hydroxylated hydrogenated polybutadiene; and
- (e) 0 to 10 mol-% of one or more 1-alkenes comprising 6 to 16 carbon atoms, wherein the monomer units derived from the conjugated dienes are hydrogenated and the copolymer has a weight-average molecular weight of 5,000 to 20,000 g/mol.

Unlike the copolymers known from the prior art, the copolymer according to the invention has a relatively low weight-average molecular weight. Preferably, the weight-average molecular weight ($M_w$) of the copolymers according to the invention is in the range of 7,000 to 20,000 g/mol, more preferably 8,000 to 20,000 g/mol. Polymers having this weight-average molecular weight have a particularly high shear resistance and offer good improvements of the viscosimetric properties of a lubricant compositions at low amounts of the copolymer.

Preferably, the copolymers of the invention have a very low degree of cross-linking and a narrow molecular weight distribution, which further contribute to their shear resistance. The low degree of crosslinking and the narrow molecular weight are reflected in the polydispersity index of the copolymers. Preferably, the polydispersity index (PDI) of the copolymers according to the invention is in the range of 1.5 to 6.0, more preferably 2.0 to 4.0, most preferably 2.2 to 3.2. A polydispersity index in the range of 2.2 to 3.2 is considered optimal for most industrial applications with regard to the shear resistance of the copolymers. The polydispersity index is defined as the ratio of weight-average molecular weight to number-average molecular weight ($M_w/M_n$).

The weight-average and number-average molecular weights are determined by gel permeation chromatography using commercially available polybutadiene calibration standards. The determination is preferably performed according to DIN 55672-1 by gel permeation chromatography with THF as eluent.

Preferably, the sum of all components (a) to (c) adds up to at least 90 mol-%, more preferably at least 95 mol-%, most preferably to 100 mol-%, based on the total amount of monomers in the monomer composition, Conjugated Dienes (Component (a))

The copolymers of the invention comprise monomers derived from one or more conjugated dienes having 6 carbon atoms or less per molecule as component (a).

Particularly suitable dienes are butadiene, cis- and trans-1-methyl-1,3-butadiene (piperylene), 2,3-dimethyl-1,3-butadiene and 2-methyl-1,3-butadiene (isoprene).

In a preferred embodiment, component (a) comprises butadiene or isoprene. Butadiene is most preferred.

According to the invention, the monomer composition comprises 5 to 55 mol-%, preferably 15 to 55 mol-%, of one or more conjugated dienes having 6 carbon atoms or less per molecule, based on the total amount of monomers in the monomer composition.

In the copolymer, the monomer units derived from the conjugated dienes are hydrogenated. Preferably, the hydrogenation is selective and does not affect the monomer units derived from the (meth)acrylic acid esters and 1-alkenes.

The selectivity of the hydrogenation can be probed by, for example, quantitative $^1H$ nuclear magnetic resonance ($^1H$ NMR) spectroscopy or infrared (IR) spectroscopy. Preferably, the hydrogenation degree, in relation to the polymerized units derived from conjugated dienes, is more than 95%, The hydrogenation degree is defined as the molar degree of saturation of carbon-carbon bonds of the polymerized units derived from conjugated dienes through addition of hydrogen relative to the non-hydrogenated starting material. The degree of hydrogenation of the random copolymer according to the present invention is measured by $^1H$ NMR spectroscopy in deuterated chloroform solution using dimethyl terephthalate as standard. The chemical shifts are calibrated using the solvent signal. To determine the hydrogenation degree, the respective signal integrals of the standard are put into relation with the signal integrals of the olefinic protons. It is necessary for each sample to repeat the measurement and determination using a non-hydrogenated reference sample in order to define 0% degree of hydrogenation.

Alkyl(Meth)Acrylates (Components (b) and (c))

The copolymers of the invention comprise a mixture of monomers derived from $C_1$-$C_8$ alkyl(meth)acrylates as component (b) and $C_7$-$C_{24}$ alkyl(meth)acrylates as component (c).

The term "(meth)acrylic acid" refers to acrylic acid, methacrylic acid and mixtures of acrylic acid and methacrylic acid; methacrylic acid being preferred. The term "(meth)acrylate" refers to esters of acrylic acid, esters of methacrylic acid or mixtures of esters of acrylic acid and methacrylic acid; esters of methacrylic acid being preferred.

The term "$C_{1-6}$ alkyl(meth)acrylates" refers to esters of (meth)acrylic acid and straight chain or branched alcohols having 1 to 6 carbon atoms. The term encompasses individual (meth)acrylic esters with an alcohol of a particular length, and likewise mixtures of (meth)acrylic esters with alcohols of different lengths. Similarly, the term "$C_{7-24}$ alkyl(meth)acrylates" refers to esters of (meth)acrylic acid and straight chain or branched alcohols having 7 to 24 carbon atoms.

Suitable $C_{1-6}$ alkyl (meth)acrylates for component (b) include, for example, methyl (meth)acrylate, ethyl (meth)acrylate, n-propyl (meth)acrylate), iso-propyl (meth)acrylate, n-butyl (meth)acrylate, iso-butyl (meth)acrylate and tert-butyl (meth)acrylate. Particularly preferred $C_{1-4}$ alkyl (meth)acrylates are methyl (meth)acrylate and butyl (meth)acrylate, In a preferred embodiment, component (b) comprises a mixture of methyl (meth)acrylate and butyl (meth)acrylate. More preferably, the butyl (meth)acrylate is n-butyl (meth)acrylate.

Suitable $C_{7-24}$ alkyl (meth)acrylates for component (c) include, for example, 2-butyloctyl (meth)acrylate, 2-hexyloctyl (meth)acrylate, decyl (meth)acrylate, 2-butyldecyl (meth)acrylate, 2-hexyldecyl (meth)acrylate, 2-octyldecyl (meth)acrylate, undecyl (meth)acrylate, 5-methylundecyl (meth)acrylate, dodecyl (meth)acrylate, 2-methyldodecyl (meth)acrylate, 2-hexyldodecyl (meth)acrylate, 2-actyldodecyl (meth)acrylate, tridecyl (meth)acrylate, 5-methyltridecyl (meth)acrylate, tetradecyl (meth)acrylate, 2-decyltetradecyl (meth)acrylate, pentadecyl (meth)acrylate, hexadecyl (meth)acrylate, 2-methylhexadecyl (meth)acrylate, heptadecyl (meth)acrylate, 5-isopropylheptadecyl (meth)acrylate, 4-tert-butyloctadecyl (meth)acrylate, 5-ethyloctadecyl (meth)acrylate, 3-isopropyloctadecyl (meth) acrylate, octadecyl (meth)acrylate, nonadecyl (meth)acrylate, eicosyl (meth)acrylate, cetyl-eicosyl (meth)acrylate, stearyl-eicosyl (meth)acrylate, docosyl (meth)acrylate, or 2-decyl-tetradecyl (meth)acrylate.

The most preferred $C_{7-24}$ alkyl (meth)acrylates are n-octyl (meth)acrylate, n-decyl (meth)acrylate, n-dodecyl (meth)acrylate, n-tetradecyl (meth)acrylate, n-pentadecyl (meth)acrylate, n-hexadecyl (meth)acrylate, n-octadecyl (meth)acrylate, n-eicosyl (meth)acrylate, n-docosyl (meth)acrylate and n-tetracosyl (meth)acrylate.

In a particularly preferred embodiment, component (c) comprises one or more $C_{10}$-$C_{16}$ alkyl(meth)acrylates, which refers to esters of (meth)acrylic acid and straight chain or branched alcohols having 10 to 15 carbon atoms. Preferably, component (c) comprises n-dodecyl (meth)acrylate.

According to the invention, the monomer composition comprises 10 to 45 mol-%, preferably 10 to 40 mol-%, of one or more $C_1$-$C_6$ alkyl(meth)acrylates as component (b), based on the total amount of monomers in the monomer composition. Preferably, the monomer composition comprises 10 to 40 mol-% of a mixture of methyl (meth)acrylate and butyl (meth)acrylate as component (b), based on the total amount of monomers in the monomer composition.

According to the invention, the monomer composition comprises 10 to 70 mol-%, preferably 15 to 55 mol-%, of one or more $C_7$-$C_{24}$ alkyl(meth)acrylates as component (c), based on the total amount of monomers in the monomer composition, preferably being the one or more $C_7$-$C_{24}$ alkyl(meth)acrylates lauryl (meth)acrylate ($C_{12}$-$C_{15}$ alkyl (meth)acrylate).

In one embodiment, the monomer composition comprises as part of component (b) 10 to 40 mol-% of a mixture of methyl(meth)acrylate and butyl(meth)acrylate and as part of component (c) 15 to 55 mol-% lauryl methacrylate.

Preferably, the sum of all components (a) to (c) adds up to at least 90 mol-%, more preferably at least 95 mol-%, most preferably to 100 mol-% based on the total amount of monomers in the monomer composition.

Esters of (Meth)Acrylic Acid and a Hydroxylated Hydrogenated Polybutadiene (Component (d))

The copolymers of the invention may optionally comprise monomers derived from esters of (meth)acrylic acid and one or more hydroxylated hydrogenated polybutadienes as component (d). Because of their high molecular weight, the hydroxylated hydrogenated polybutadienes can also be referred to as macroalcohols in the context of this invention. The resulting esters can also be referred to as macromonomers in the context of this invention.

According to the invention, the monomer composition comprises 0 to 10 mol-%, preferably 0 to 5 mol-%, more preferably 0.1 to 5 mol-% of one or more macromonomers as component (d), based on the total amount of monomers in the monomer composition.

Preferably, the sum of all components (a) to (d) adds up to at least 90 mol-%, more preferably at least 95 mol-%, most preferably to 100 mol-% based on the total amount of monomers in the monomer composition.

Component (d) may comprise a single type of macromonomer or may comprise a mixture of different macromonomers based on different macroalcohols.

The hydroxylated hydrogenated polybutadienes of component (d) preferably have a number-average molecular weight $M_n$ of 500 g/mol to 10,000 g/mol, preferably 700 to 8,000 g/mol, most preferably 1,000 to 5,000 g/mol.

In a preferred embodiment, component (d) is one rnacromonomer prepared using one rnacroalcohol having a number average molecular weight of 1,500 to 3,000 g/mol, preferably 1,800 to 2,100 g/mol, The number-average molecular weight $M_n$ is determined by gel permeation chromatography using commercially available polybutadiene standards. The determination is performed according to DIN 55672-1 by gel permeation chromatography with THF as eluent.

Preferably, the hydroxylated hydrogenated polybutadienes have a hydrogenation level of at least 99%, which can be determined, for example, by $^1$H NMR spectroscopy. An alternative measure to determine the hydrogenation level of the copolymer is the iodine number. The iodine number refers to the number of grams of iodine which can be added onto 100 g of polymer. Preferably, the hydroxylated hydrogenated polybutadienes have an iodine number of not more than 5 g of iodine per 100 g of polymer. The iodine number is determined by the Wijs method according to DIN 53241-1:1995-05.

Preferred hydroxylated hydrogenated polybutadienes can be obtained according to GB 2270317.

As used herein, the term "hydroxylated hydrogenated polybutadiene" refers to a hydrogenated polybutadiene that comprises at least one hydroxyl group. The hydroxylated hydrogenated polybutadiene may further comprise additional structural units, such as polyether groups derived from the addition of alkylene oxides to a polybutadiene or a maleic anhydride group derived from the addition of maleic anhydride to a polybutadiene. These additional structural units may be introduced into the polybutadiene when the polybutadiene is functionalized with hydroxyl groups.

Preference is given to monohydroxylated hydrogenated polybutadienes More preferably, the hydroxylated hydrogenated polybutadiene is a hydroxyethyl- or hydroxypropyl-terminated hydrogenated polybutadiene. Particular preference is given to hydroxypropyl-terminated polybutadienes.

These monohydroxylated hydrogenated polybutadienes can be prepared by first converting butadiene monomers by anionic polymerization to polybutadiene. Subsequently, by reaction of the polybutadiene monomers with an alkylene oxide, such as ethylene oxide or propylene oxide, a hydroxy-functionalized polybutadiene can be prepared. The polybutadiene may also be reacted with more than one alkylene oxide units, resulting in a polyether-polybutadiene block copolymer having a terminal hydroxyl group. The hydroxylated polybutadiene can be hydrogenated in the presence of a suitable transition metal catalyst.

These monohydroxylated hydrogenated polybutadienes can also be selected from products obtained by hydroboration of (co)polymers of having a terminal double bond (e.g. as described in U.S. Pat. No. 4,316,973); maleic anhydride-ene-amino alcohol adducts obtained by an ene reaction between a (co)polymer having a terminal double bond and maleic anhydride with an amino alcohol; and products obtained by hydroformylation of a (co)polymer having a terminal double bond, followed by hydrogenation (e.g, as described in JP Publication No. S63-175096).

The macromonomers for use in accordance with the invention can be prepared by transesterification of alkyl (meth)acrylates. Reaction of the alkyl (meth)acrylate with the hydroxylated hydrogenated polybutadiene forms the ester of the invention. Preference is given to using methyl (meth)acrylate or ethyl (meth)acrylate as reactant.

This transesterification is widely known. For example, it is possible for this purpose to use a heterogeneous catalyst system, such as lithium hydroxide/calcium oxide mixture (LiOH/CaO), pure lithium hydroxide (LiOH), lithium methoxide (LiOMe) or sodium methoxide (NaOMe) or a homogeneous catalyst system such as isopropyl titanate (Ti(OiPr)$_4$) or dioctyltin oxide (Sn(OCt)$_2$O). The reaction is an equilibrium reaction. Therefore, the low molecular weight alcohol released is typically removed, for example by distillation.

In addition, the macromonomers can be obtained by a direct esterification proceeding, for example, from (meth) acrylic acid or (meth)acrylic anhydride, preferably under acidic catalysis by p-toluenesulfonic acid or methanesulfonic acid, or from free methacrylic acid by the DCC method (dicyclohexylcarbodiimide).

Furthermore, the present hydroxylated hydrogenated polybutadiene can be converted to an ester by reaction with an acid chloride such as (meth)acryloyl chloride Preferably, in the above-detailed preparations of the esters of the invention, polymerization inhibitors are used, for example the 4-hydroxy-2,2,6,6-tetramethylpiperidinooxyl radical and/or hydroquinone monomethyl ether.

1-Alkenes (Component (E))

The copolymers of the invention may optionally comprise monomers derived from 1-alkenes having 6 to 16 carbon atoms as component (e). The 1-alkenes may be branched or linear and may comprise more than one unsaturated bond. In the case of 1-alkenes comprising more than one unsaturated bond, the monomer units derived from these 1-alkenes are preferably also hydrogenated as described above for the conjugated dienes.

Suitable 1-alkenes are, for example, 1-hexene, 1-octene, 1-decene and 1-docadecene. In a preferred embodiment, component (e) comprises 1-decene, According to the invention, the monomer composition comprises 0 to 10 mol-%, preferably 0 to 5 mol-%, more preferably 0.1 to 5 mol-% of one or more 1-alkenes having 6 to 16 carbon atoms as component (e), based on the total amount of monomers in the monomer composition.

Preferably, the sum of all components (a) to (e) adds up to at least 90 mol-%, more preferably at least 95 mol-%, most preferably to 100 mol-% based on the total amount of monomers in the monomer composition.

Additional Monomers (Component (F))

The monomer composition may also comprise further monomers (f) in addition to the components (a) to (e) described above.

Additional monomers which can be used in accordance with the invention can selected, for example, from the group consisting of styrene monomers having from 8 to 17 carbon atoms, vinyl esters having from 1 to 11 carbon atoms in the acyl group, vinyl ethers having from 1 to 10 carbon atoms in the alcohol group, dispersing oxygen- and/or nitrogen-functionalized monomers, heterocyclic (meth)acrylates, heterocyclic vinyl compounds, monomers containing a covalently bonded phosphorous atom, monomers containing epoxy groups and monomers containing halogens.

Suitable styrene monomers having from 8 to 17 carbon atoms are selected from the group consisting of styrene, substituted styrenes having an alkyl substituent in the side chain, for example alpha-methylstyrene and alpha-ethylstyrene, substituted styrenes having an alkyl substituent on the ring, such as vinyltoluene and para-methylstyrene, halogenated styrenes, for example monochlorostyrenes, dichlorostyrenes, tribromostyrenes and tetrabromostyrenes, nitrostyrene; styrene being preferred.

Suitable vinyl esters having from 1 to 11 carbon atoms in the acyl group are selected from the group consisting of vinyl formate, vinyl acetate, vinyl propionate, vinyl butyrate; preferably vinyl esters including from 2 to 9, more preferably from 2 to 5 carbon atoms in the acyl group, wherein the acyl group may be linear or branched Suitable vinyl ethers having from 1 to 10 carbon atoms in the alcohol group are selected from the group consisting of vinyl methyl ether, vinyl ethyl ether, vinyl propyl ether, vinyl butyl ether; preferably vinyl ethers including from 1 to 8, more preferably from 1 to 4 carbon atoms in the alcohol group, wherein the alcohol group may be linear or branched.

Suitable dispersing oxygen- and/or nitrogen-functionalized monomers are selected from the group consisting of aminoalkyl (meth)acrylates, such as N,N-dimethylaminoethyl (meth)acrylate, N,N-dimethylaminopropyl (meth) acrylate, N,N-diethylaminopentyl (meth)acrylate, N,N-dibutylaminohexadecyl (meth)acrylate; aminoalkyl(meth) acrylamides, such as N,N-dimethylaminopropyl(meth) acrylamide; hydroxyalkyl (meth)acrylates, such as 3-hydroxypropyl (meth)acrylate, 3,4-dihydroxybutyl (meth) acrylate 2-hydroxyethyl (meth)acrylate, 2-hydroxypropyl (meth)acrylate, 2,5-dimethyl-1,6-hexanediol (meth)acrylate, 1,10-decanediol (meth)acrylate, p-hydroxystyrene, vinyl alcohol, alkenols ((methyl)allyl alcohol having 3 to 12 carbon atoms, multivalent (3-8 valent) alcohol (glycerol, pentaerythritol, sorbitol, sorbitan, doglycerides sugars) ether or meth(acrylate); $C_{1-8}$-alkyloxy-$C_{2,4}$-alkyl (meth)acrylates, such as methoxypropyl (meth)acrylate, methoxy-butyl (meth)acrylate, methoxy heptyl (meth)acrylate, methoxy hexyl (meth)acrylate, methoxy pentyl (meth)acrylate, methoxy octyl (meth)acrylate, ethoxyethyl (meth)acrylate, ethoxypropyl (meth)acrylate, ethoxy-butyl (meth)acrylate, ethoxy heptyl (meth)acrylate, ethoxyhexyl (meth)acrylate, ethoxypentyl (meth)acrylate, ethoxyoclyl (meth) acrylate, proxymethyl (meth)acrylate, proxyethyl (meth)acrylate, proxypropyl (meth)acrylate, proxybutyl (meth)acrylate, proxyheptyl (meth)acrylate, proxyhexyl (meth)acrylate, proxypentyl (meth)acrylate, proxyoctyl (meth)acrylate, butoxymethyl (meth)acrylate, butoxyethyl (meth)acrylate, butoxypropyl (meth)acrylate, butoxybutyl (meth)acrylate, butoxyheptyl (meth)acrylate, butoxyhexyl (meth)acrylate, butoxypentyl (meth)acrylate and butoxyoctyl (meth)acrylate, ethoxyethyl (meth)acrylate and butoxyethyl (meth) acrylate are being preferred.

Suitable heterocyclic (meth)acrylates are selected form the group consisting of 2-(1-imidazolyl)ethyl (meth)acrylate, 2-(4-morpholinyl)ethyl (meth)acrylate, 1-(2-methacryloyloxyethyl)-2-pyrrolidone, N-methacryloylmorpholine, N-methacryloyl-2-pyrrolidinone, N-(2-methacryloyloxyethyl)-2-pyrrolidinone, N-(3-methacryloyloxypropyl)-2-pyrrolidinone.

Suitable heterocyclic vinyl compounds are selected from the group consisting of 2-vinylpyridine, 4-vinylpyridine, 2-methyl-5-vinylpyridine, 3-ethyl-4-vinylpyridine, 2,3-dimethyl-5-vinylpyridine, vinylpyrimidine, vinylpiperidine, 9-vinylcarbazole, 3-vinylcarbazole, 4-vinylcarbazole, 1-vinylimidazole, 2-methyl-1-vinylimidazole, N-vinylpyrrolidone, N-vinylpyrrolidine, 3-vinylpyrrolidine, N-vinylcaprolactam, N-vinylbutyrolactam, vinyloxolane, vinylfuran, vinyloxazoles and hydrogenated vinyloxazoles.

Monomers containing a covalently bonded phosphorous atom are selected from the group consisting of 2-(dimethylphosphato)propyl (meth)acrylate, 2-(ethylenephosphito) propyl (meth)acrylate, dimethylphosphinomethyl (meth) acrylate, dimethylphosphonoethyl (meth)acrylate, diethyl (meth)acryloyl phosphonate, dipropyl(meth)acryloyl phosphate, 2 (dibutylphosphono)ethyl (meth)acrylate, diethylphosphatoethyl (meth)acrylate, 2-(dimethylphosphato)-3-hydroxypropyl (meth)acrylate, 2-(ethylenephosphito)-3-hydroxypropyl (meth)acrylate, 3-(meth)acryloyloxy-2-hydroxypropyl diethyl phosphonate, 3-(meth)acryloyloxy-2-hydroxypropyl dipropyl phosphonate, 3-(dimethylphosphato)-2-hydroxypropyl (meth)acrylate, 3-(ethylenephosphito)-2-hydroxypropyl (meth)acrylate, 2-(meth)acryloyloxy-3-hydroxypropyl diethyl phosphonate, 2-(meth)acryloyloxy-3-hydroxypropyl dipropyl phosphonate and 2 (dibutylphosphono)-3-hydroxypropyl (meth)acrylate.

Suitable monomers containing epoxy groups are, for example, glycidyl (meth)acrylate and glycidyl (meth)allyl ether and the like.

Monomers containing halogens are, for examples, such as vinyl chloride, vinyl bromide, vinylidene chloride, (meth)allylchloride and halogenated styrene (dichlorostyrene etc) and the like.

The most preferred additional monomers (f) are selected from styrene monomers having from 8 to 17 carbon atoms, hydroxyethyl(meth)acrylate, N,N-dimethylaminoethyl (meth)acrylate, N,N-dimethylaminopropyl (meth)acrylate or a mixture thereof.

Preferably, the amount of additional monomers (f) is limited to 0 to 10 mol-%, more preferably 0 to 8 mol-%, most preferably 0 to 6 mol-%, based on the total amount of monomers in the monomer composition.

Preferably, the sum of all components (a) to (f) adds up to 100 mol-% based on the total amount of monomers in the monomer composition.

Preferred Monomer Compositions

In a preferred embodiment, the monomer composition comprises
- (a) 15 to 55 mol-% of one or more conjugated dienes having 6 carbon atoms or less per molecule;
- (b) 10 to 40 mol-% of one or more $C_1$-$C_6$ alkyl(meth)acrylates;
- (c) 15 to 55 mol-% of one or more $C_7$-$C_{24}$ alkyl(meth)acrylates;
- (d) 0 to 5 mol-% of one or more esters of (meth)acrylic acid and a hydroxylated hydrogenated polybutadiene; and
- (e) 0 to 5 mol-% of one or more 1-alkenes comprising 6 to 16 carbon atoms, based on the total amount of monomers in the monomer composition.

In a further preferred embodiment, the monomer composition comprises
- (a) 15 to 55 mol-% of one or more conjugated dienes having 6 carbon atoms or less per molecule;
- (b) 10 to 40 mol-% of one or more $C_1$-$C_6$ alkyl(meth)acrylates;
- (c) 15 to 55 mol-% of one or more $C_7$-$C_{24}$ alkyl(meth)acrylates;
- (d) 0.1 to 5 mol-% of one or more esters of (meth)acrylic acid and a hydroxylated hydrogenated polybutadiene; and
- (e) 0 to 5 mol-% of one or more 1-alkenes comprising 6 to 16 carbon atoms, based on the total amount of monomers in the monomer composition.

In another further preferred embodiment, the monomer composition comprises
- (a) 15 to 55 mol-% of one or more conjugated dienes having 6 carbon atoms or less per molecule;
- (b) 10 to 40 mol-% of one or more $C_1$-$C_6$ alkyl(meth)acrylates;
- (c) 15 to 55 mol-% of one or more $C_7$-$C_{24}$ alkyl(meth)acrylates;
- (d) 0 to 5 mol-% of one or more esters of (meth)acrylic acid and a hydroxylated hydrogenated polybutadiene; and
- (e) 0.1 to 5 mol-% of one or more 1-alkenes comprising 6 to 16 carbon atoms, based on the total amount of monomers in the monomer composition.

Preferably, the sum of all components (a) to (e) adds up to at least 90 mol-%, more preferably at least 95 mol-%, most preferably to 100 mol-%, based on the total amount of monomers in the monomer composition.

In an even more preferred embodiment, the monomer composition comprises
- (a) 15 to 55 mol-% of one or more conjugated dienes having 6 carbon atoms or fess per molecule;
- (b) 10 to 40 mol-% of one or more C1-C6 alkyl(meth)acrylates;
- (c) 15 to 55 mol-% of one or more C7-C24 alkyl(meth)acrylates;
- (d) 0 to 5 mol-% of one or more esters of (meth)acrylic acid and a hydroxylated hydrogenated polyb adiene; and
- (e) 0 to 5 mol-% of one or more 1-alkenes comprising 6 to 16 carbon atoms,
- (f) 0 to 6 mol-% of one or more additional monomers (f) as listed above, preferably styrene monomers having from 8 to 17 carbon atoms, hydroxyethyl(meth)acrylate, N,N-dimethylaminoethyl (meth)acrylate, N,N-dimethylaminopropyl (meth)acrylate or a mixture thereof, based on the total amount of monomers in the monomer composition.

Most preferably, the sum of all components (a) to (f) adds up to 100 mol-% based on the total amount of monomers in the monomer composition.

Random Architecture

The copolymers of the invention are of random architecture. The random architecture of the copolymers of the invention can be probed by measuring the glass transition temperature $T_g$ using differential scanning calorimetry (DSC). The random copolymers according the invention—in contrast to block copolymers or gradient copolymers—typically possess a single conjunct glass transition temperature $T_g$.

Preferably, the glass transition temperature $T_g$ of the copolymers as determined by differential scanning calorimetry (DSC) is in the range of 0° C. to −100° C., more preferably −20° C. to −80° C., most preferably −50° C. to −60° C. Preferably, indium and cyclohexane are used as standard.

Manufacturing Method

The invention also relates to a method for manufacturing the above-mentioned copolymers, the method comprising the steps of:
- (i) providing a monomer composition as described above;
- (ii) initiating radical polymerization in solution in the monomer composition to obtain a random copolymer; and
- (iii) hydrogenation of the random copolymer, Radical Polymerization (Steps (i) and (ii))

Standard free-radical polymerization is detailed, inter alfa, in Ullmann's Encyclopedia of Industrial Chemistry, Sixth Edition. In general, a polymerization initiator and optionally a chain transfer agent are used for this purpose.

The copolymers of the invention can be obtained via ATRP methods. This reaction regime is described, for example, by J.-S. Wang, et al., J. Am. Chem. Soc, vol. 117, p. 5614-5615 (1995), by Matyjaszewski, Macromolecules, vol. 28, p. 7901-7910 (1995). In addition, patent applications WO 96/30421, WO 97/47661, WO 97/18247, WO 98/40415 and WO 99/10387 disclose variants of the above-elucidated ATRP.

Furthermore, the copolymers of the invention can also be obtained via RAFT methods. For example, the RAFT method is described in detail in WO 98/01478 and WO 2004/083169.

According to the present invention, the polymerization to prepare the copolymers is performed by free radical polymerization in solution.

According to a preferred embodiment, the random copolymers of the invention are prepared by free radical solution polymerization, in which case the reaction mixture during step (ii) preferably comprises the monomer composition (step (i)), one or more radical initiators, a solubilizing carrier medium as described below and optionally one or more chain transfer agents.

Solution polymerization is the preferred method for carrying out the process of the invention, because it allows adjusting the concentration of the monomer composition in the reaction mixture by adding more or less solubilizing carrier medium, By selecting the correct concentration of the monomer composition in the reaction mixture, the molecular weight and the polydispersity index of the resulting copolymer can be controlled, Preferably, the total amount of monomer composition in the reaction mixture is between 5 and 95% by weight, more preferably 10 to 70% by weight, even more preferably 20 to 45% by weight, most preferably 35 to 45% by weight, based on the total weight of the reaction mixture. Monomer concentrations higher than 20% are usually preferred on industrial scale. A concentration of the monomer composition in the range of 20 to 45% by weight, preferably 35 to 45% by weight, based on the total weight of the reaction mixture, is considered optimal, because it yields random copolymers having a low weight-average molecular weight in the range of 8,000 to 20,000 g/mol and a low polydispersity index in the range of 2.2 to 3.2.

The polymerization is preferably performed at a temperature of 20° C. to 200° C., more preferably 50° C. to 150° C., the reaction pressure is preferably 1 bar to 30 bar, more preferably 10 bar to 28 bar and the total reaction time of the radical polymerization is 1 to 10 hours.

In a preferred embodiment, polymerization is carried out at a temperature of 90° C. to 130° C., preferably 110 to 130° C., a pressure of 12 bar to 25 bar, preferably 15 bar to 23 bar and a total reaction time of 2 to 9 hours, preferably 3 to 7 hours.

Preferably, the solubilizing carrier medium used is selected from the group consisting of mineral oils, synthetic ohs, ketones, ester solvents, aromatic hydrocarbons, cycloaliphatic hydrocarbons and aliphatic hydrocarbons or mixtures thereof.

Examples for mineral oils are paraffinic oils, naphthenic oils, solvent-refined oils, isoparaffin-containing high VI oils and hydrocracked high VI oils. Examples for synthetic oils are organic esters, for example diesters and polyesters, like carboxylic esters and phosphate esters; organic ethers like silicone oils, perfluoro-alkyl ethers and polyalkylene glycol; and synthetic hydrocarbons, especially polyolefins and Gas to Liquids oils (GU). Examples for ketones are butanone and methyl ethyl ketone. Examples for ester solvents are fatty oils, and synthetic ester lubricants (for example, di-C4-12 alkyl C4-12 dicarboxylates, such as dioctyl sebacate and dioctyl adipate, polyol poly-C4-12 alkanoates, such as pentaerythritol tetra-caproate; and tri-C4-12 hydrocarbyl phosphates, such as tri-2-ethylhexyl phosphate, dibutyl phenyl phosphate, di-2-ethylhexyl phenyl phosphate, 2-ethylhexyl diphenyl phosphate and tricresyl phosphate). Examples for aromatic hydrocarbons are benzene, toluene, xylene, ethylbenzene, trifmethyl benzene, ethyl toluene and mixtures of them. Examples for cycloaliphatic hydrocarbons are cyclohexane, methyl cyclohexane and cycloaliphatic terpenes. Examples for aliphatic hydrocarbons are n-pentane, n-hexane, n-heptane, 1-decene and aliphatic terpenes.

In a preferred embodiment, the solubilizing carrier medium is a cycloaliphatic or aliphatic or aromatic hydrocarbon, preferably cyclohexane, 1-decene or toluene, even more preferably cyclohexane or toluene.

Step (ii) comprises the addition of a radical initiator.

Suitable radical initiators are, for example, azo initiators, such as azobis-isobutyronitrile (AIBN), 2,2'-azobis(2-methylbutyronitrile) (AMBN) and 1,1-azobiscyclohexanecarbonitrile, and peroxy compounds such as methyl ethyl ketone peroxide, acetylacetone peroxide, dilauryl peroxide, ketone peroxide, tert-butyl peroctoate, methyl isobutyl ketone peroxide, cyclohexanone peroxide, dibenzoyl peroxide, tert-butyl peroxybenzoate, tert-butyl peroxyisopropylcarbonate. 2,5-bis(2-ethylhexanoylperoxy)-2,5-dimethylhexane, tert-butyl peroxy-3,5,5-trimethylhexanoate, dicumyl peroxide, 1,1-bis(tert-butylperoxy)cyclohexane, 1,1-bis(teti-butylperoxy)-3,3,5-trimethylcyclohexane, cumyl hydroperoxide, tert-butyl hydroperoxide and bis(4-tert-butylcyclohexyl) peroxydicarbonate.

Preferably, the radical initiator is selected from the group consisting of 2,2'-azobis(2-methylbutyronitrile), 2,2-bis(tert-butylperoxy)butane, 1,1-di-tert-butylperoxy-3,3,5-trimethylcyclohexane, tert-butyl peroxybenzoate and tert-butylperoxy-3,5,5-trimethylhexanoate. In a particularly preferred embodiment the radical initiator is 2,2-bis(tert-butylperoxy)butane.

Preferably, the total amount of radical initiator relative to the total weight of the monomer mixture is 0.01 to 5% by weight, more preferably 0.02 to 1% by weight, most preferably 0.05 to 0.5% by weight.

The total amount of radical initiator may be added in a single step or the radical initiator may be added in several steps over the course of the polymerization reaction. Preferably, the radical initiator is added in several steps. For example, a part of the radical initiator may be added to initiate radical polymerization and a second part of the radical initiator may be added 0.5 to 3.5 hours after the initial dosage.

Step (ii) optionally comprises the addition of a chain transfer agent. Examples of chain transfer agents are sulfur containing compounds such as thiols, e.g. n- and t-dodecanethiol, 2-mercaptoethanol, and mercapto carboxylic acid esters, e.g. methyl-3-mercaptopropionate or longer chain alkenes. Preferred chain transfer agents are alkenes having up to 20 carbon atoms, especially up to 15 carbon atoms and more preferably up to 12 carbon atoms. Particularly preferred is the addition of 1-decene, After completion of the radical polymerization, the product is preferably filtered to remove any impurities present in the reaction mixture, followed by the evaporation of any volatile solvents.

Hydrogenation (Step (iii))

On an industrial scale for this present invention, it is required to have a hydrogenated copolymer without the presence of double bonds as this reduces the reactivity of the copolymer against chemical oxidation, cross-linking or other undesired side reactions. Therefore, in step (iii), the inventors of the present invention carried out a selective hydrogenation of the diene units as described below.

Selective hydrogenations of random copolymers or other (co)polymers, comprising one or more polymerized units derived from conjugated diolefins, are typically performed in bulk or in the presence of at least one solubilizing carrier medium using hydrogen gas or other hydrogen sources as reduction agents either in heterogeneous fashion using insoluble, supported metal or metal complex catalysts or in homogeneous fashion using soluble, organometallic catalysts, A detailed description of homogeneously catalyzed hydrogenation can be found for example in U.S. Pat. No. 3,541,064 and GB 1,030,306. Since it offers economic advantages, heterogeneous catalysis using insoluble, supported metals as catalysts is widely used for industrial selective hydrogenation processes and usually preferred over other processes. Selective hydrogenation process according to the present invention is preferably a heterogeneous catalysis process using insoluble, supported metals as catalyst.

High reactivity (i.e. fast conversion of unsaturated carbon-carbon bonds of the polymerized units derived from conjugated diolefins into saturated carbon-carbon bonds) and high selectivity (i.e, the preservation of polymerized units other than derived from conjugated diolefins) are typical requirements for selective hydrogenation reactions of random copolymers or other (co)polymers, comprising one or more polymerized units derived from conjugated diolefins. Also, a high hydrogenation degree as defined previously is desired. In order to meet these requirements, the following parameters may typically be adjusted:

Typical catalytically active metals for heterogeneously catalyzing the selective hydrogenation according to the invention include, but are not limited to, Ru, Rh, Pd, Ir, Pt, Mn, Cr, Fe, Co, Ni, U, Cu, Nd, In, Sn, Zn, Ag, Cr and alloys of one or more of these metals, Catalysts containing Pd are particularly preferred.

Typical catalyst supports include, but are not limited to oxides (Al2O3, TiO2, SiO2 or others), carbon, kieselguhr or other carriers.

The selective hydrogenation process according to the present invention is preferably performed using a heterogeneous carbon-supported Pd catalyst. The use of a carbon-supported Pd catalyst is preferred, because it allows performing the hydrogenation of the double bonds derived from the conjugated dienes with high selectivity and reactivity. It has also been found that a copolymer hydrogenated with a carbon-supported Pd catalyst requires less extensive work-up alter hydrogenation than a copolymer prepared according to the process described in U.S. Pat. No. 4,533,482.

The heterogeneous catalysts can be used, for example, in the form of pellets or powders. Powders are particularly preferred.

The amount of catalytically active metal loaded on the support preferably is 0.1 to 10% by weight, more preferably 1 to 10% by weight, based on the total weight of the supported catalyst.

The copolymer obtained in step (ii) may preferably be provided in a composition further including a solubilizing carrier medium. Purification as described above is preferably performed before the hydrogenation step (iii) in order to remove any impurities produced during radical polymerization step (h), which may lead to a reduction in the level of hydrogenation.

Preferably, the solubilizing carrier medium is selected from the group consisting of mineral oils, synthetic ohs, ketones, ester solvents, aromatic hydrocarbons, cycloaliphatic hydrocarbons and aliphatic hydrocarbons or mixtures thereof.

Examples for mineral oils are paraffinic oils, naphthenic oils, solvent-refined oils, isoparaffin-containing high VI oils and hydrocracked high VI oils. Examples for synthetic oils are organic esters, for example diesters and polyesters, like carboxylic esters and phosphate esters; organic ethers like silicone oils, perfluoro-alkyl ethers and polyalkylene glycol; and synthetic hydrocarbons, especially polyolefins and Gas to Liquids oils (GTL). Examples for ketones are butanone and methyl ethyl ketone. Examples for ester solvents are fatty oils, and synthetic ester lubricants (for example, di-C4-12 alkyl C4-12 dicarboxylates, such as dioctyl sebacate and dioctyl adipate, polyol poly-C4-12 alkanoates, such as pentaerythritol tetra-caproate; and tri-C4-12 hydrocarbyl phosphates, such as tri-2-ethylhexyl phosphate, dibutyl phenyl phosphate, di-2-ethylhexyl phenyl phosphate, 2-ethylhexyl diphenyl phosphate and tricresyl phosphate). Examples for aromatic hydrocarbons are benzene, toluene, xylene, ethylbenzene, trimethyl benzene, ethyl toluene and mixtures of them. Examples for cycloaliphatic hydrocarbons are cyclohexane, methyl cyclohexane and cycloaliphatic terpenes. Examples for aliphatic hydrocarbons are n-pentane, n-hexane, n-heptane, 1-decene and aliphatic terpenes.

In a preferred embodiment, hydrogenation is carried out in the presence of a cycloaliphatic or aliphatic hydrocarbon, preferably cyclohexane.

The concentration of the random copolymer in the solubilizing carrier medium in the hydrogenation step (iii) can typically be in the range of 5 and 95% by weight. Preferably, the concentration of the random copolymer in the solubilizing carrier medium is 10 to 70% by weight of random copolymer, based on the total weight of copolymer and carrier medium.

In the case that hydrogen gas is used as a reducing agent, the reaction pressure preferably is between 5 and 1500 bar, either as constant or gradient pressure. More preferably, the reaction pressure is 5 to 500 bar, even more preferably 10 to 300 bar, and most preferably 70 to 120 bar.

The reaction temperature in the hydrogenation step (iii) preferably is 0 to 200° C., more preferably 20 to 150° C., even more preferably 20 to 120° C.

In a particularly preferred embodiment, hydrogenation is carried out in the presence of a carbon-supported Pd catalyst at a temperature of 20 to 120° C. and a pressure of 70 to 120 bar. More preferably, cyclohexane or toluene are used as solubilizing carrier medium under these conditions. It has been found that these conditions are optimal for preparing the above-described copolymers, as they lead to high reactivity and selectivity in the selective hydrogenation of the double bonds derived from the conjugated dienes. Moreover, these conditions help to minimize the work up required to obtain the hydrogenated copolymer from the hydrogenation mixture in comparison to the difficult work-up conditions disclosed for example in U.S. Pat. No. 4,533,482.

Compositions

The invention also relates to a composition comprising
(x) at least one base oil; and
(y) one or more of the above-mentioned hydrogenated random copolymers of the present invention.

Due to the presence of the copolymer according to the invention, the compositions have excellent viscosity index, filterability and low foam formation.

The composition may be an additive composition comprising the copolymer according to the invention and a base oil as diluent. The additive composition may, for example, be added as a viscosity index improver to lubricants. Typically, the additive composition comprises a relatively high amount of copolymer according the invention.

The composition may also represent a lubricant composition comprising the copolymer according to the invention, a base oil and optionally further additives as discussed below. The lubricant composition may, for example, be used as an engine oil or transmission fluid. Typically, the lubricant composition comprises a lower amount of copolymer according to the invention as compared to the aforementioned additive composition.

If the composition is used as an additive composition, the amount of base oil(s) (component x) preferably is 40 to 80% by weight, more preferably 50 to 70% by weight and the amount of copolymer (component y) preferably is 20 to 60% by weight, more preferably 30 to 50% by weight.

If the composition is used as a lubricant composition, the amount of base oil(s) (component x) preferably is 50 to 99% by weight, more preferably 70 to 97% by weight and the amount of copolymer (component y) preferably is 1 to 50% by weight, more preferably 2 to 20% by weight, most preferably 5 to 20% by weight.

Preferably, the amounts of (x) and (y) add up to 100% by weight, based on the total weight of the lubricant composition.

The base oil to be used in the composition preferably comprises one or more oils of lubricating viscosity. Such oils include natural and synthetic oils, oil derived from hydrocracking, hydrogenation, and hydro-finishing, unrefined, refined, re-refined oils or mixtures thereof.

The base oil may also be defined as specified by the American Petroleum Institute (API) (see April 2008 version of "Appendix E-API Base Oil Interchangeability Guidelines for Passenger Car Motor Oils and Diesel Engine Oils", section 1.3 Sub-heading 1,3. "Base Stock Categories").

The API currently defines five groups of lubricant base stocks (API 1509, Annex E—API Base Oil Interchangeability Guidelines for Passenger Car Motor Oils and Diesel Engine Oils, September 2011). Groups I, II and III are mineral oils which are classified by the amount of saturates and sulphur they contain and by their viscosity indices; Group IV are polyalphaolefins; and Group V are all others, including e.g. ester oils. Table 1 below illustrates these API classifications.

TABLE 1

| Group | Saturates | Sulphur content | Viscosity Index (VI) |
|---|---|---|---|
| I | <90% | >0.03% | 80-120 |
| II | at least 90% | not more than 0.03% | 80-120 |
| III | at least 90% | not more than 0.03% | at least 120 |
| IV | All polyalphaolefins (PAOs) | | |
| V | All others not included in Groups I, II, III or IV (e.g. ester oils) | | |

The kinematic viscosity at 100° C. ($KV_{100}$) of appropriate apolar base oils used to prepare a lubricant composition in accordance with the present invention is preferably in the range of 1 mm$^2$/s to 10 mm$^2$/s, more preferably in the range of 2 mm$^2$/s to 8 mm$^2$/s, according to ASTM D445.

Further base oils which can be used in accordance with the present invention are Group II-III Fischer-Tropsch derived base oils.

Fischer-Tropsch derived base oils are known in the art. By the term "Fischer-Tropsch derived" is meant that a base oil is, or is derived from, a synthesis product of a Fischer-Tropsch process. A Fischer-Tropsch derived base oil may also be referred to as a GTL (Gas-To-Liquids) base oil. Suitable Fischer-Tropsch derived base oils that may be conveniently used as the base oil in the lubricating composition of the present invention are those as for example disclosed in EP 0 776 959, EP 0 668 342, WO 97/21788, WO 00/15736, WO 00/14188, WO 00/14187, WO 00/14183, WO 00/14179, WO 00/08115, WO 99/41332, EP 1 029 029, WO 01/18156, WO 01/57166 and WO 2013/189951.

Especially for transmission oil formulations, base oils of API Group III and mixtures of different Group III oils are used. In a preferred embodiment, the base oil may also be a polyalphaolefin base oil or a mixture of a polyalphaolefin base oil with an API Group III base oil or a mixture of API Group III base oils.

In a particularly preferred embodiment, the base oil is an API group III base oil or a polyalphaolefin base oil.

The lubricant composition according to the invention may also contain, as component (z), further additives selected from the group consisting of dispersants, defoamers, detergents, antioxidants, pour point depressants, antiwear additives, extreme pressure additives, anticorrosion additives, dyes and mixtures thereof.

Appropriate dispersants include poly(isobutylene) derivatives, for example poly(isobutylene)succinimides (PIBSIs), including borated PIBSIs; and ethylene-propylene oligomers having N/O functionalities.

Dispersants (including borated dispersants) are preferably used in an amount of 0 to 5% by weight, based on the total amount of the lubricant composition.

Suitable defoamers are silicone oils, fluorosilicone oils, fluoroalkyl ethers, etc.

The defoaming agent is preferably used in an amount of 0.005 to 0.1% by weight, based on the total amount of the lubricant composition.

The preferred detergents include metal-containing compounds, for example phenoxides; salicylates; thiophosphonates, especially thiopyrophosphonates, thiophosphonates and phosphonates; sulfonates and carbonates. As metal, these compounds may contain especially calcium, magnesium and barium. These compounds may preferably be used in neutral or overbased form.

Detergents are preferably used in an amount of 0.2 to 1% by weight, based on the total amount of the lubricant composition.

The suitable antioxidants include, for example, phenol-based antioxidants and amine-based antioxidants.

Phenol-based antioxidants include, for example, octadecyl-3-(3,5-di-tert-butyl-4-hydroxyphenyl)propionate; 4,4'-methylenebis(2,6-di-tert-butylphenol); 4.4'-bis(2,6-di-t-butylphenol); 4,4'-bis(2-methyl-6-t-butylphenol); 2,2'-methylenebis(4-ethyl-6-t-butylphenol); 2,2'-methylenebis(4-methyl-6-t-butyl phenol); 4,4'-butylidenebis(3-methyl-6-t-butylphenol); 4,4'-isopropylidenebis(2,6-di-t-butylphenol); 2,2'-methylenebis(4-methyl-6-nonylphenol); 2,2'-isobutylidenebis(4,6-dimethylphenol); 2,2'-methylenebis(4-methyl-6-cyclohexylphenol); 2,6-di-t-butyl-4-methylphenol; 2,6-di-t-butyl-4-ethyl-phenol; 2,4-dimethyl-6-t-butylphenol; 2,6-di-t-amyl-p-cresol; 2,6-di-t-butyl-4-(N,N'-dimethylaminomethylphenol); 4,4'-thiobis(2-methyl-6-t-butylphenol); 4,4'-thiobis(3-methyl-6-t-butylphenol); 2,2'-thiobis(4-methyl-6-t-butylphenol); bis(3-methyl-4-hydroxy-5-t-butylbenzyl) sulfide; bis(3,5-di-t-butyl-4-hydroxybenzyl) sulfide; n-octyl-3-(4-hydroxy-3,5-di-t-butylphenyl)propionate; n-octadecyl-3-(4-hydroxy-3,5-di-t-butylphenyl)propionate; 2,2'-thio[diethyl-bis-3-(3,5-di-t-butyl-4-hydroxyphenyl)propionate], etc. Of those, especially preferred are bis-phenol-based antioxidants and ester group containing phenol-based antioxidants.

The amine-based antioxidants include, for example, monoalkyldiphenylamines such as rnonooctyldiphenyiamine, rnonononyldiphenylamine, etc.; dialkyldiphenylamines such as 4,4'-dibutyldiphenylamine, 4,4'-dipentyldiphenylamine, 4,4'-dihexyldiphenylamine, 4,4'-diheptyldiphenylamine, 4,4'-dioctyldiphenylamine, 4,4'-dinonyldiphenylamine, etc.; polyalkyldiphenylamines such as tetrabutyidiphenylamine, tetrahexyldiphenylamine, tetraoctyidiphenylamine, tetranonyldiphenylamine, etc.; naphthylamines, concretely alpha-naphthylamine, phenyl-alpha-naphthylamine and further alkyl-substituted phenyl-alpha-naphthylamines such as butylphenyl-alpha-naphthylamine, pentylphenyl-alpha-naphthylamine, hexylphenyl-alpha-naphthylamine, heptylphenyl-alpha-naphthylamine, octylphenyl-alpha-naphthylamine, nonylphenyl-alpha-naphthylamine, etc. Of those, diphenyiamines are preferred to naphthylamines, from the viewpoint of the antioxidation effect thereof.

Suitable antioxidants may further be selected fram the group consisting of compounds containing sulfur and phosphorus, for example metal dithiophosphates, for example zinc dithiophosphates (ZnDTPs), "OOS triesters"=reaction products of dithiophosphoric acid with activated double bonds from olefins, cyclopentadiene, norbornadiene, α-pinene, polybutene, acrylic esters, maleic esters (ashless on combustion); organosulfur compounds, for example dialkyl sulfides, diaryl sulfides, polysulfides, modified thiols, thiophene derivatives, xanthates, thioglycols, thioaldehydes, sulfur-containing carboxylic acids; heterocyclic sulfur/nitrogen compounds, especially dialkyldimercaptothiadiazoles, 2-mercaptobenzimidazoles; zinc bis(dialkyldithiocarbamate) and methylene bis(dialkyldithiocarbamate); organophosphorus compounds, for example triaryl and trialkyl phosphites; organocopper compounds and overbased calcium- and magnesium-based phenoxides and salicylates.

Antioxidants are used in an amount 0% to 15% by weight, preferably 0.1 to 10% by weight, more preferably 0.5 to 5% by weight, based on the total amount of the lubricant composition.

The pour-point depressants include ethylene-vinyl acetate copolymers, chlorinated paraffin-naphthalene condensates, chlorinated paraffin-phenol condensates, polymethacrylates, polyalkylstyrenes, etc. Preferred are polymethacrylates having a mass-average molecular weight from 5.000 to 200.000 g/mol, The amount of the pour point depressant s preferably from 0.1 to 5% by weight, based on the total amount of the lubricant composition.

The preferred antiwear and extreme pressure additives include sulfur-containing compounds such as zinc dithiophosphate, zinc di-$C_{3-12}$-alkyldithiophosphates (ZnDTPs), zinc phosphate, zinc dithiocarbamate, molybdenum dithiocarbamate, molybdenum dithiophosphate, disulfides, sulfurized olefins, sulfurized oils and fats, sulfurized esters, thiocarbonates, thiocarbamates, polysulfides, etc.; phosphorus-containing compounds such as phosphites, phosphates, for example trialkyl phosphates, triaryl phosphates, e.g. tricresyl phosphate, amine-neutralized mono- and dialkyl phosphates, ethoxylated mono- and dialkyl phosphates, phosphonates, phosphines, amine salts or metal salts of those compounds, etc,; sulfur and phosphorus-containing antiwear agents such as thiophosphites, thiophosphates, thiophosphonates, amine salts or metal salts of those compounds, etc.

The antiwear agent may be present in an amount of 0 to 3% by weight, preferably 0.1 to 1.5% by weight, more preferably 0.5 to 0.9% by weight, based on the total amount of the lubricant composition.

The preferred friction modifiers may include mechanically active compounds, for example molybdenum disulphide, graphite (including fluorinated graphite), poly (trifluorethylene), polyamide, polyimide, compounds which form adsorption layers, for example long-chain carboxylic acids, fatty acid esters, ethers, alcohols, amines, amides, imides; compounds which from layers through tribochemical reactions, for example saturated fatty acids, phosphoric acid and thiophosphoric esters, xanthogenates, sulphurized fatty acids; compounds which form polymer-like layers, for example ethoxylated dicarboxylic acid partial esters, dialkyl phthalates, methacrylates, unsaturated fatty acids, sulphurized olefins and organometallic compounds, for example molybdenum compounds (molybdenum dithiophosphates and molybdenum dithiocarbamates MoDTC) and their combinations with ZnDTPs, copper-containing organic compounds.

Some of the compounds listed above may fulfil multiple functions. ZnDTP, for example, is primarily an antiwear additive and extreme pressure additive, but also has the character of an antioxidant and corrosion inhibitor (here: metal passivator/deactivator).

The above-detailed additives are described in detail, inter alia, in T. Mang, W. Dresel (eds.), "Lubricants and Lubrication", Wiley-RICH, Weinheim 2001; R. M. Mortier, S. T. Orszulik (eds.): "Chemistry and Technology of Lubricants".

Preferably, the total concentration of the one or more additives (z) is up to 20% by weight, more preferably 0.05% to 15% by weight, more preferably 5% to 15% by weight, based on the total weight of the lubricant composition.

Preferably, the amounts of components (x), (y) and (z) add up to 100% by weight.

The lubricant composition of the invention preferably has a viscosity index of more than 140. The viscosity index may be measured according to ASTM D2270.

If the lubricant composition according to the present invention is used as an engine oil, it preferably comprises between 0.05% by weight and 20% by weight of the copolymers according to the invention, based on the total weight of the lubricant composition, leading to a kinematic viscosity at 100° C. being in the range from 3 $mm^2$/s to 10 $mm^2$/s according to ASTM D445.

If the lubricant composition of the present invention is used as an automotive gear oil, it preferably comprises between 2% by weight to 35% by weight of the copolymers according to the invention, based on the total weight of the lubricant composition, leading to a kinematic viscosity at 100° C. being in the range from 2 $mm^2$/s to 15 $mm^2$/s according to ASTM D445.

If the lubricant composition of the present invention is used as an automatic transmission oil, it preferably comprises between 1% by weight and 25% by weight of the copolymers according to the invention in the base oil, based on the total weight of the lubricant composition, leading to a kinematic viscosity at 100° C. being in the range from 2 $mm^2$/s to 9 $mm^2$/s according to ASTM D445.

If the lubricant composition of the present invention is used as an industrial gear oil, it preferably comprises between 15% by weight and 80% by weight of the copolymers according to the invention, based on the total weight of the lubricant composition, leading to a kinematic viscosity at 100° C. being in the range from 10 $mm^2$/s to 130 $mm^2$/s according to ASTM D445.

If the lubricant composition of the present invention is used as a hydraulic oil, it preferably comprises between 1% by weight to 20% by weight of the copolymers according to the invention, based on the total weight of the lubricant composition, leading to a kinematic viscosity at 100° C. being in the range from 3 mm$^2$/s to 20 mm$^2$/s according to ASTM D445.

Applications of the Copolymer According to the Invention

The invention also relates to the use of the above-mentioned copolymer as an additive for a lubricant composition for improving the viscosity index of the lubricant composition. The copolymer of the invention can thereby be used as a viscosity index improver that—while providing high VI to the lubricating oil composition—is highly soluble in the lubricating oil composition and allows to maintain excellent properties of the lubricating oil composition such as an excellent shear resistance, filterability and low foam formation. The inventors of the present invention have surprisingly found out that, even when the polymers of the invention are mixed with a lubricant base oil at low treat rate, they show high thickening efficiency in comparison to the viscosity index improvers of the state of the art.

The copolymers of the present invention and the lubricant compositions comprising the copolymers according to the invention are favorably used for driving system lubricating oils (such as manual transmission fluids, differential gear oils, automatic transmission fluids and belt-continuously variable transmission fluids, axle fluid formulations, dual clutch transmission fluids, and dedicated hybrid transmission fluids), hydraulic oils (such as hydraulic oils for machinery, power steering oils, shock absorber oils), engine oils (for gasoline engines and for diesel engines) and industrial oil formulations (such as wind turbine).

The copolymer is preferably used in an amount of 0.05 to 50% by weight, more preferably 1 to 30% by weight, based on the total amount of the lubricant composition.

Experimental Part

The invention is illustrated by the following non-limiting examples.

Test Methods

The weight-average molecular weight $M_w$ and the polydispersity index PDI of the random copolymers of the invention were determined using a Tosoh EcoSEC GPC system "HLC-8320" equipped with a PSS SDV 5 μm pre-column and a 30 cm PSS SDV 5 μm linear S separation column, as well as an RI detector at a flow rate of 0.3 mL/min at T=40° C. with tetrahydrofuran (THF) as eluent against polybutadiene calibration standards.

The weight-average molecular weights of the comparative polyalkyl methacrylate (PAMA) sample was determined by gel permeation chromatography (GPC) using polymethyl methacrylate calibration standards and THF as the eluent, The composition of the random copolymers of the invention, the hydrogenation degree and the selectivity of the hydrogenation process were determined by means of 1H-NMR spectroscopy in deuterated chloroform.

Glass transition temperatures were measured via differential scanning calorimetry on a Mettler-Toledo DSC1. Mettler Toledo STARe 10.00 software was used for analysis. Indium and cyclohexane were used as standard. In two heating/cooling cycles 8 to 10 mg of the samples were cooled to −80° C. with a cooling rate of 20 K/min. After 10 min, the samples were heated to 200° C. with a heat rate of 10 K/min. The glass transition temperatures were derived from the second heating cycle.

Kinematic viscosity was measured according to ASTM D 445.

The Viscosity Index was determined according to ASTM D 2270.

For formulations with KV100 Target of 8.0 cSt—Viscosity loss at 100° C. was measured after 20 h at 60° C. in the tapered roller bearing test (KRL) according to CEC-L-45-A-99 against the fresh oil kinematic viscosity at 100° C.

For formulation with KV 100 target of 7.0 cSt—Viscosity loss at 100° C. was measured after 40 h at 80° C. in the tapered roller bearing test (KRL) according to CEC-L-45-A-99 against the fresh oil kinematic viscosity at 100° C.

Foam performance of the lubricant oil compositions was measured according to ASTM D-892.

Filterability of the lubricant oil compositions was measured with a 5 μm filter at a pressure of 1 bar in dry stage according to ISO 133576-2 Stage 1.

Synthesis of Polymers

Non-crosslinked random copolymers 1 to 5 and 7* to 9* were prepared by free radical solution polymerization using the monomer compositions shown in table 2 below. The monomers were mixed with toluene at a temperature of 20° C. and a pressure of 10 bar in a 5 L autoclave so that the concentration of the monomers relative to the total weight of the mixture is 40% by weight. The temperature was increased to 120° C. using a heat rate of 5.5° C./min, before the initiator, 2,2-bis(tert-butylperoxy)butane (50% by weight in liquid paraffin) was added. Free radical copolymerization was performed at a reaction temperature of 120° C., a reaction pressure of 20 bar and a reaction time of 4 h. The discharge was filtered and volatile solvents were evaporated. The obtained copolymers were then selectively hydrogenated. The non-cross random copolymer 6 was prepared following the same preparation procedure but the solvent was cyclohexane instead of toluene,

TABLE 2

Synthesis of random copolymers

| | inventive examples | | | | | | comparative examples | | |
|---|---|---|---|---|---|---|---|---|---|
| Random copolymer no. | 1 | 2 | 3 | 4 | 5 | 6$^a$ | 7* | 8* | 9* |
| Monomer concentration | 40 | 40 | 40 | 40 | 40 | 40 | 40 | 40 | 40 |
| Butadiene [mol-%] | 45.2 | 35 | 47.9 | 35.8 | 23.4 | 43.2 | 66.4 | 55.5 | 10.2 |
| Methyl methacrylate [mol-%] | 14.8 | 12.3 | 9.7 | 2.0 | 18.2 | 20.2 | 26.0 | 39.3 | 67.4 |
| Butyl methacrylate [mol-%] | 13.7 | 11.7 | 10.6 | 8.7 | 11.6 | 15.4 | 6.7 | 4.4 | 22.5 |

TABLE 2-continued

Synthesis of random copolymers

| | inventive examples | | | | | | comparative examples | | |
|---|---|---|---|---|---|---|---|---|---|
| Random copolymer no. | 1 | 2 | 3 | 4 | 5 | 6[a] | 7* | 8* | 9* |
| Lauryl methacrylate [mol-%] | 26 | 40 | 31 | 53.8 | 46.1 | 21.0 | — | — | — |
| Macromonomer [mol-%] | — | — | 0.8 | — | — | — | — | — | — |
| 1-decene [mol-%] | — | — | — | — | — | — | 0.9 | 0.8 | — |
| Conversion [%] | 92 | 93 | 92 | 97 | 98 | 100 | 70 | 75 | 86 |
| PDI | 2.85 | 2.64 | 2.56 | 2.70 | 2.74 | 2.67 | 2.9 | 3.1 | 2.01 |
| $M_w$ [g/mol] | 14,500 | 12,400 | 18,200 | 14,400 | 11,930 | 12,680 | 14,400 | 12,300 | 12,750 |

[a]The polymerization was carried out in cyclohexane instead of toluene.
*Comparative examples As shown in Table 2, the high level of control during the radical polymerization is reflected by the PDI values of the non-hydrogenated random copolymers, which are all lower than 3.3. The reaction conditions of the solution polymerization as described in the present invention enable the preparation of random copolymers with satisfactory PDI values, low Mw and good solubility properties.

For selective hydrogenation, 1.5 L of a 40% solution by weight of a random, unsaturated copolymer In cyclohexane was charged to a 2 L autoclave and 0.38% by weight of Pd per polymer of a 5% Pd/C shell catalyst powder were introduced. Hydrogenation was carried out under stirring at a reaction temperature of 90° C. and a $H_2$ reaction pressure of 90 bar until a hydrogenation degree of 95% or higher was achieved. The discharge was filtered and volatile components were evaporated. All polymerized units other than those derived from the conjugated diene (butadiene) were not converted during selective hydrogenation.

A lubricant oil composition comprising an API group III base fluid (Nexbase 3043) and a commercially available additive package and either one of the copolymers 1 to 3 or 7* to 8* or a polyalkylmethacrylate (PAMA) type viscosity additive were prepared. In addition, a second formulation was conducted with an API group IV base fluid (PAO4) and a commercially available additive package and copolymer 1 or a polyalkylmethacrylate (PAMA).

To compare the individual lubricant oil compositions, the kinematic viscosity at 100° C. of each composition was adjusted to 8.0 cSt (see Table 4). Compositions 1 to 4 and 5* and 6* were made with hydrogenated random copolymers 10, 11, 12, 16* or 17*, respectively. Compositions 7* and 8* was prepared with a copolymer of $C_{12-15}$ methacrylates synthesized according to example 1 of US 2013/0229016 A1.

For each composition in Nexbase 3043 (composition 1 to 3 and 5* to 7*), viscosimetric properties, foam formation

TABLE 3

Synthesis of hydrogenated random copolymers

| | inventive examples | | | | | | comparative examples | | |
|---|---|---|---|---|---|---|---|---|---|
| Hydrogenated copolymer no. | 10 | 11 | 12 | 13 | 14 | 15 | 16* | 17* | 18* |
| Random copolymer no. | 1 | 2 | 3 | 4 | 5 | 6 | 7 | 8 | 9 |
| Random non-hydrogenated Copolymer [g] | 500 | 540 | 541 | 384 | 392 | 413 | 312 | 202 | 1067 |
| Cyclohexane (carrier medium) [g] | 750 | 810 | 709 | 1000 | 880 | 874 | 988 | 798 | — |
| Hydrogenation reaction time [h] | 18.5 | 12 | 12.5 | 13 | 32 | 22.5 | 18 | 15 | — |
| Hydrogenation degree [%] | 100 | 100 | 96.7 | 100 | 98.2 | 100 | 93.7 | 97.4 | — |
| Tg [° C.] | −52 | −56 | −60 | −50 | −57 | −51 | −46 | −24 | +26 |
| $M_w$ [g/mol] | 14,500 | 12,400 | 18,200 | 14,400 | 11,930 | 12,680 | 14,400 | 12,300 | 12,750 |

*Comparative examples

The degree of hydrogenation was calculated as described above in the section relating to hydrogenation (NMR results). As shown in Table 3, the obtained hydrogenated random copolymers of the present invention all have a high level of hydrogenation (more than 96% of the butadiene is hydrogenated).

Evaluation of Lubricant Oil Compositions

To demonstrate the use of the copolymers according to the present invention as lubricant additives, several different compositions with the different hydrogenated copolymers were used.

Lubricant Oil Formulation-KV 100=8.0 cSt and filterability were determined. For each composition in PAO4 (composition 4 and 8*), viscosimetric properties were determined (see table 4 below).

It was found that the comparative copolymers 16* and 17* were insoluble in the base oil, showing that the copolymers according to the invention have a higher degree of compatibility with the base oil. The addition of an additive package would not solve the solubility problem and the comparative copolymers 16* and 17* remain insoluble.

Furthermore, it was found that the amount (treat rate) of the inventive copolymers 10 to 12 required to achieve good kinematic viscosity and a good viscosity index is lower than for the comparative PAMA additive. Thus, the copolymers according to the invention are highly efficient viscosity index improvers. Further, the copolymers according to the invention showed a good shear stability as demonstrated by the low viscosity loss at 100° C. after 20 h KLR.

Finally, the copolymers of the invention have a positive impact on foam formation and filterability as compared to the conventional PAMA additive.

As shown in the inventive composition 4 of Table 4 below, the copolymer 10 according to the invention shows the amount (treat rate) of the copolymer 10 required to achieve a good kinematic viscosity and a good viscosity index is lower than the comparative PAMA additive (composition 8*) when both are tested in a formulation with a base oil PAO4, an API Group 4 oil.

TABLE 4

Properties of lubricant oil compositions (KV100 = 8 cSt)

| Composition | inventive examples | | | | comparative examples | | | |
|---|---|---|---|---|---|---|---|---|
| | 1 | 2 | 3 | 4 | 5*a | 6*a | 7* | 8* |
| Copolymer no. | 10 | 11 | 12 | 10 | 16* | 17* | PAMA | PAMA |
| Amount of copolymer [wt.-%] | 8.90 | 10.60 | 7.20 | 10.35 | 5.0 | 5.0 | 16.0 | 18.20 |
| Additive Package [wt.-%] | 6.50 | 6.50 | 6.50 | 6.50 | — | — | 6.50 | 6.50 |
| Nexbase 3043 [wt.-%] | 84.60 | 82.90 | 86.30 | — | 95.0 | 95.0 | 77.50 | 75.30 |
| PAO 4 [wt-%] | — | — | — | 83.15 | — | — | — | — |
| Kinematic viscosity at 100° C. [cSt] | 7.990 | 7.983 | 8.028 | 8.068 | — | — | 7.929 | 8.003 |
| Kinematic viscosity at 40° C. [cSt] | 41.97 | 42.06 | 41.82 | 41.92 | — | — | 41.24 | 41.08 |
| Viscosity Index | 166 | 165 | 168 | 169 | — | — | 168 | 171 |
| Viscosity loss at 100° C. after 20 h KRL | 10.5% | 9.5% | 10.0% | 7.15% | — | — | 2.8% | 1.22% |
| Foam after blowing period. Sequence I, 24° C. [mL] | 0 | 10 | 10 | — | — | — | 20 | |
| Foam after 10 min. Sequence I, 24° C. [mL] | 0 | 10 | 0 | — | — | — | 0 | |
| Foam collapse time. Sequence I, 24° C. [s] | 0 | 0 | 7 | — | — | — | 188 | |
| Filterability Stage 1, Scania 5 μm filter | 93.8% | 100.6% | 104.9% | — | — | — | 102.8% | |
| Filterability Stage 2, Scania 5 μm filter | 94.4% | 100.0% | 104.7% | — | — | — | 95.7% | | aCopolymers 4 and 5 were insoluble in Nexbase 3043 with or without the addition of additive package
*Comparative example As shown in Table 4, the presence of a $C_1$ to $C_6$ chain methacrylate together with a longer $C_7$ to $C_{30}$ chain methacrylate such as lauryl methacrylate is necessary to alter the polarity of the random block copolymer to enable the solubility of the polymer in the lubricant oil compositions tested.

Lubricant Oil Formulation 2 (KV 100=7.0 cSt)

As shown in Table 5 below, to compare further the use of the copolymers according to the present invention as lubricant additives, a second lubricant oil formulation was used, compromising an API group III base fluid (Nexbase 3030) and a commercially available additive package and either one of the copolymers 4, 5 or 6 or a polyalkylmethacrykate (PAMA).

To compare the individual lubricant oil compositions, the kinematic viscosity at 100° C. of each composition was adjusted to 7.0 cSt, Compositions 9 to 11 were made with hydrogenated random copolymers 13 to 15, respectively. Composition 12* was prepared with a copolymer of $C_{12-15}$ methacrylates synthesized according to example 1 of US 2013/0229016 A1.

For each composition, viscosimetric properties were determined (see table 5 below).

TABLE 5

Properties of lubricant oil compositions (KV 100 = 7.0 cSt)

| | inventive examples | | | comparative example |
|---|---|---|---|---|
| Composition | 9 | 10 | 11 | 12* |
| Copolymer no. | 13 | 14 | 15 | PAMA |
| Amount of copolymer [wt.-%] | 12.9 | 15.8 | 12.2 | 20.8 |
| Additive Package [wt.-%] | 6.50 | 6.50 | 6.50 | 6.50 |
| Nexbase 3030 [wt.-%] | 80.6 | 77.70 | 81.30 | 72.7 |
| Kinematic viscosity at 100° C. [cSt] | 7.023 | 6.986 | 7.017 | 7.063 |

TABLE 5-continued

Properties of lubricant oil compositions (KV 100 = 7.0 cSt)

| | inventive examples | | | comparative example |
|---|---|---|---|---|
| Composition | 9 | 10 | 11 | 12* |
| Kinematic viscosity at 40° C. [cSt] | 32.4 | 32.84 | 33.54 | 33.53 |
| Viscosity Index | 187 | 181 | 178 | 180 |
| Viscosity loss at 100° C. after 40 h KRL | 16.2 | 16.45 | 18.64 | 9.3 |

*Comparative example

It was found that the amount (treat rate) of the inventive copolymers 13 to 15 required to achieve good kinematic viscosity and a good viscosity index is lower than for the comparative PAMA additive. Thus, the copolymers according to the invention are highly efficient viscosity index improvers.

The copolymers according to the invention show a good shear stability when compared to the conventional PAMA additive, In conclusion, the examples show that the hydrogenated random copolymers of the invention fulfill the requirements of the lubricant technical field, by having a lower treat rate (high thickening efficiency), the required oxidative stability, no cross-linking and oil solubility.

The invention claimed is:

1. A random copolymer, obtainable by polymerizing a monomer composition comprising:
   (a) 5 to 55 mol-% of one or more conjugated dienes having 6 carbon atoms or less per molecule;
   (b) 10 to 45 mol-% of one or more $C_1$-$C_6$ alkyl(meth)acrylates;
   (c) 10 to 70 mol-% of one or more $C_7$-$C_{24}$ alkyl(meth)acrylates;
   (d) 0 to 10 mol-% of one or more esters of (meth)acrylic acid and a hydroxylated hydrogenated polybutadiene; and
   (e) 0 to 10 mol-% of one or more 1-alkenes comprising 6 to 16 carbon atoms;
   based on the total amount of monomers in the monomer composition;
   wherein the monomer units derived from the conjugated dienes are hydrogenated and the copolymer has a weight-average molecular weight of 5,000 to 20,000 g/mol; and
   wherein the sum of all components (a) to (d) adds up to at least 90 mol-%, based on the total amount of monomers in the monomer composition.

2. The copolymer of claim 1, wherein the monomer composition comprises:
   (a) 15 to 55 mol-% of one or more conjugated dienes having 6 carbon atoms or less per molecule;
   (b) 10 to 40 mol-% of one or more $C_1$-$C_6$ alkyl(meth)acrylates;
   (c) 15 to 55 mol-% of one or more $C_7$-$C_{24}$ alkyl(meth)acrylates;
   (d) 0 to 5 mol-% of one or more esters of (meth)acrylic acid and a hydroxylated hydrogenated polybutadiene; and
   (e) 0 to 5 mol-% of one or more 1-alkenes comprising 6 to 16 carbon atoms;
   based on the total amount of monomers in the monomer composition.

3. The copolymer of claim 2, wherein the sum of all components (a) to (d) adds up to 100 mol-%, based on the total amount of monomers in the monomer composition.

4. The copolymer of claim 3, comprising a PDI of 2.2 to 3.2.

5. The copolymer of claim 4, wherein:
   component (a) comprises butadiene or isoprene;
   component (b) comprises a mixture of methyl (meth)acrylate and n-butyl (meth)acrylate;
   component (c) comprises one or more $C_{10}$-$C_{16}$ alkyl (meth)acrylates.

6. The copolymer of claim 1, having a weight-average molecular weight of 7,000 to 20,000 g/mol.

7. The copolymer of claim 1, comprising a PDI of 1.5 to 6.

8. The copolymer of claim 1, comprising a PDI of 2 to 4.

9. The copolymer of claim 1, comprising a PDI of 2.2 to 3.2.

10. The copolymer of claim 1, wherein component (a) comprises butadiene or isoprene.

11. The copolymer of claim 1, wherein component (b) comprises a mixture of methyl (meth)acrylate and n-butyl (meth)acrylate.

12. The copolymer of claim 1, wherein component (c) comprises one or more $C_{10}$-$C_{16}$ alkyl(meth)acrylates.

13. A method for manufacturing the random copolymer of claim 1, the method comprising the steps of:
   (i) providing the monomer composition of claim 1;
   (ii) initiating radical polymerization in solution in the monomer composition to obtain a random copolymer; and
   (iii) hydrogenating the random copolymer.

14. The method of claim 13, wherein hydrogenation is performed using a carbon-supported Pd catalyst.

15. The method of claim 14, wherein hydrogenation is performed at a temperature of 20 to 120° C. and a pressure of 70 to 120 bar.

16. A composition comprising:
   (x) at least one base oil; and
   (y) one or more copolymers of claim 1.

17. The composition of claim 1, wherein the base oil is a polyalphaolefin base oil, an API group III base oil, a mixture of a polyalphaolefin base oil with an API group III base oil, or a mixture of API group III base oils.

18. The composition of claim 17, comprising 0.05 to 50% by weight of the one or more copolymers of claim 1, based on the total amount of the lubricant composition.

19. The composition of claim 17, comprising 1 to 30% by weight, of the copolymer, based on the total amount of the lubricant composition.

20. The composition of claim 17, wherein the composition is a lubricant with a viscosity index of more than 140 when measured according to ASTM D2270.

* * * * *